Nov. 17, 1970 — W. E. KLUND — 3,541,458
FREQUENCY DOMAIN SIGNAL PROCESSOR HAVING ADAPTIVE CAPABILITY
Filed Oct. 30, 1968 — 4 Sheets-Sheet 1

INVENTOR.
WILLIAM E. KLUND
ATTORNEYS

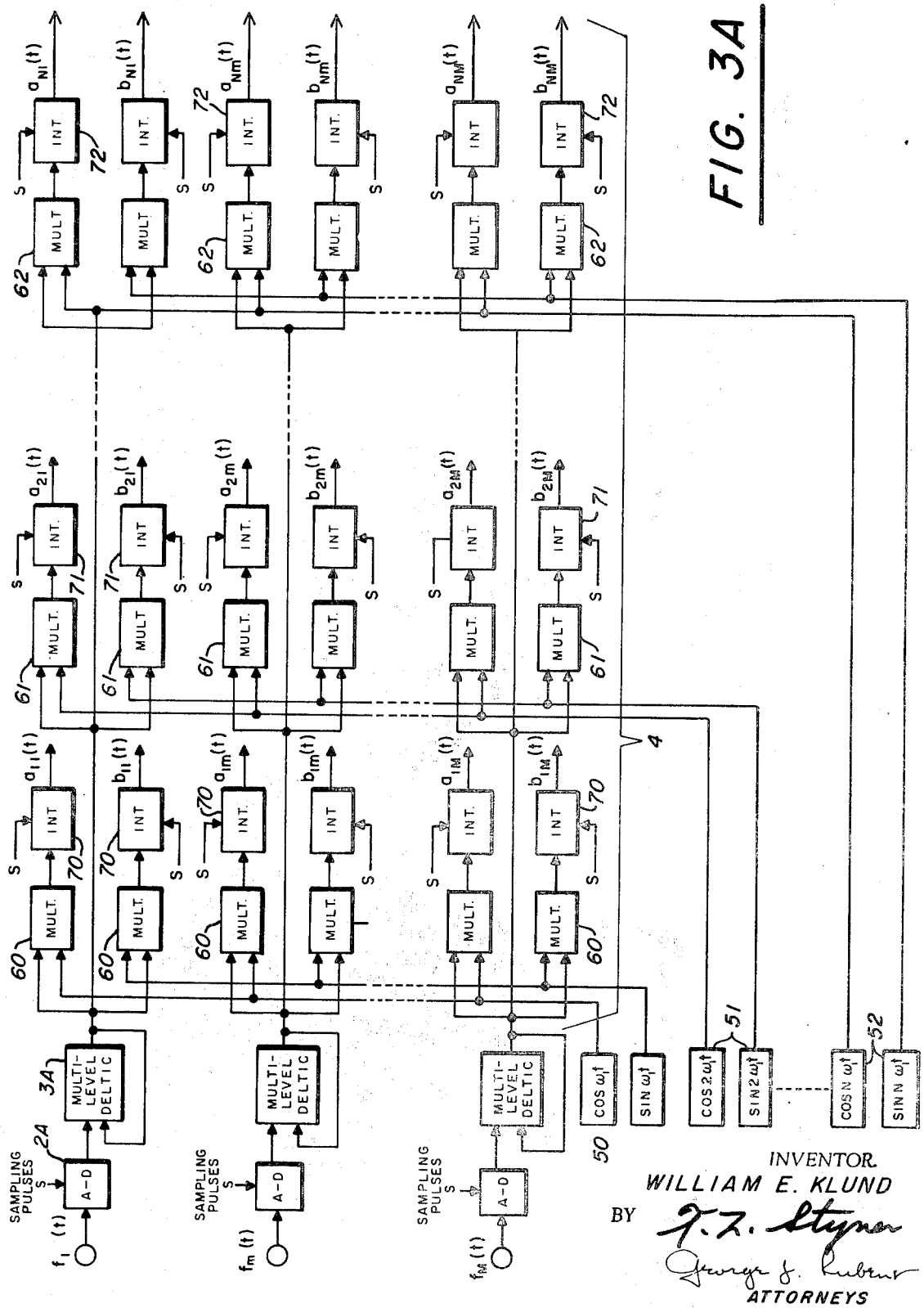

Nov. 17, 1970

W. E. KLUND 3,541,458

FREQUENCY DOMAIN SIGNAL PROCESSOR HAVING ADAPTIVE CAPABILITY

Filed Oct. 30, 1968

INVENTOR.
WILLIAM E. KLUND
BY
ATTORNEYS

United States Patent Office 3,541,458
Patented Nov. 17, 1970

3,541,458
FREQUENCY DOMAIN SIGNAL PROCESSOR HAVING ADAPTIVE CAPABILITY
William E. Klund, 1441 Yost Drive,
San Diego, Calif. 92109
Filed Oct. 30, 1968, Ser. No. 771,756
Int. Cl. H03b 1/04
U.S. Cl. 328—165                          17 Claims

ABSTRACT OF THE DISCLOSURE

When a spatially diverse array of sensors is used to detect the presence of a weak signal originating from a localized source in space, the array output is frequently contaminated by noise which originates from many sources at locations different from that of the signal source. By proper adjustment of the amplitude and phase weights applied to the sensor outputs, it is possible to cause the sum of the weighted outputs to be free of the effects of the spatially stationary part of the surrounding noise field and concurrently to respond in a preferential manner to signals which originate from the desired signal location.

---

The invention described herein may be manufactured and used by or for the Government of the United States of America for governmental purposes without the payment of any royalties thereon or therefor.

BACKGROUND OF THE INVENTION

In the past, arrays of geophones have been used in oil exploration to form beams in order to create preferential array response to signals originating from a particular spatial direction. The array element amplitude and phase responses in these cases have been adjusted solely on the assumption that the surrounding noise field is random isotropic and that the desired signal energy arrives with a plane wave front. Shading of arrays has been effective in the reduction of sidelobes but has not solved the problem of the strong interfering source capable of overriding the reduced sidelobe response. More recently, adaptive beams which respond preferentially to signals which originate from a particular spatial location and which concurrently minimize the array response to the composite effects of many surrounding spatially stationary noise sources have come into being. Heretofore systems utilizing these latter techniques have required adaptation machinery of enormous computational capability to determine the element amplitude and phase weights, particularly for those systems having more than a few sensor elements. Typically, these systems have made use of iterative adaptation learning techniques or have required the inversion of matrices whose elements represent self and cross power spectral densities associated with the sensor outputs.

The object of this invention is to provide an improved apparatus and method of processing the signals conveyed by an array of information channels.

A more specific object of this invention is to provide a direct and simplified solution of the problem of improving the signal to noise ratio which can be extracted from an array of sensors.

SUMMARY OF THE INVENTION

The objects of this invention are attained by transforming each information channel time varying output into the frequency domain by using a Fourier series representation of the waveform and by considering that the resulting vectors, for each frequency component, are a multiphase unbalanced set capable of being resolved into a corresponding set of symmetrical components. The appropriate Fourier coefficients are used in conjunction with symmetrical component theory to compute a set of amplitude and phase weights which will result in elimination of the response due to the spatially stationary portions of the surrounding noise field and which will reproduce a signal originating from a selected location in space.

Other objects and features of this invention will become apparent to those skilled in the art by referring to preferred embodiments described in the following specification and shown in the accompanying drawings in which:

FIG. 3A is a block diagram of one technique of deriving complex Fourier coefficients useful in the systems of FIG. 1 or FIG 2;

THEORY OF THE INVENTION

Figure 1:
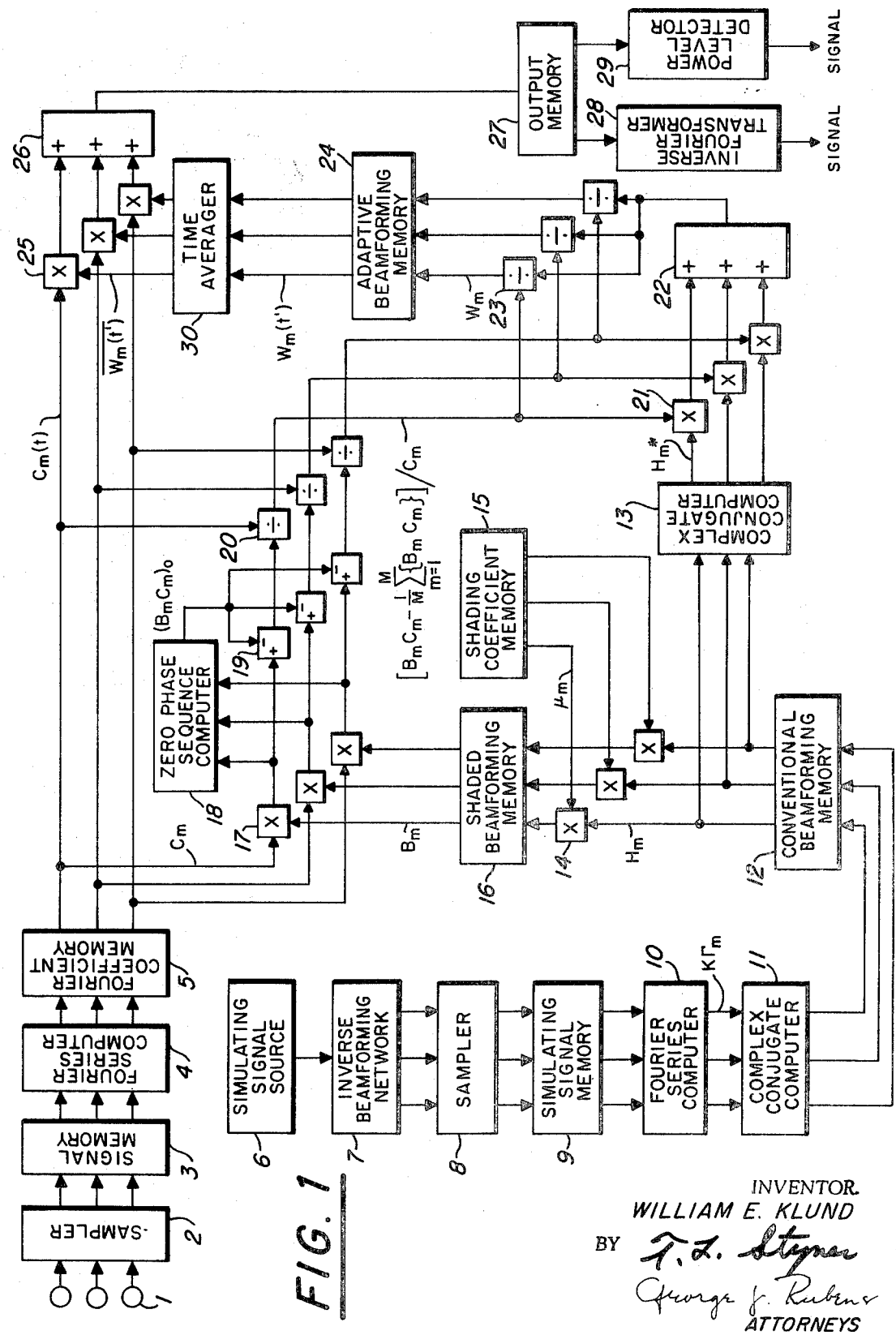
FIG. 1 is a block diagram of one of said preferred embodiments of the invention.

The time varying output of a sensor or of an information channel can be represented with a high degree of accuracy by a set of complex numbers, more commonly referred to as vectors, corresponding to the complex amplitudes of the Fourier series expansion of that time function such as a sure tone. For any time function whose spectral content does not change with time and which originates from an apparent spatially stationary location, successive values of these vectors each remain approximately constant if the zero time reference point remains fixed at a particular instant in real time. That is, each Fourier complex coefficient $C_n(t)$ may be found from the following relation:

$$C_n(t) = (2/T) \int_{t-T}^{t} f(t) e^{-j2n\pi t/T} dt \quad (1)$$

where $t$ is real time and has a present value of $t$. If the zero time reference point progresses in real time with successive expansions, successive values of the vectors essentially retain their respective amplitudes, but rotate with angular velocities approximately corresponding to the respective Fourier frequency components. That is, $$C_n(t) = (2/T) \int_{-T}^{0} g(\tau) e^{-j2n\pi\tau/T} d\tau \quad (2)$$

where $\tau$ is relative time which is presently zero at real time $t$ and $g(\tau)$ is the original waveform represented in relative time. In the former $C_n(t) = C_n$, which is a constant vector. In the latter case $C_n(t) = C_n e^{j2n\pi t/T}$, which is a constant amplitude rotating vector. In either of these conventions, the future values of $C_n(t)$ are predictable, and hence the waveform is predictable if the incoming sensor waveform is of spatially stationary origin. This invention utilizes complex multiplicative amplitude and phase weighing to eliminate the spatially stationary noise field output, and it is thus immaterial which of these zero reference time conventions is chosen.

The complex Fourier coefficients may alternatively be computed in terms of their real and imaginary parts, which are the standard Fourier cosine and sine coefficients. Any error in representation of $C_n(t)$ as a constant vector, or as a constant amplitude uniformly rotating vector, arises as a result of the fact that the Fourier transformation is made over a finite time interval. This results in an equally spaced line spectrum whose components may not exactly superpose upon the true infinite-time spectrum of the incoming time function. If the incoming sensor time function originates from a non-stationary spatial location or is quasi-stationary for a time less than the Fourier expansion interval, corresponding vectors from successive expansions are random in amplitude and phase regardless of the placement of the zero time reference point. It is this difference in behavior which enables the spatially stationary part of the noise field to be eliminated from the system output.

Each sensor output may then be viewed, in the frequency domain, as consisting of a progression of successive vectors for each frequency component present in the Fourier expansions. For convenience, further description will usually be directed to a single frequency component since the principle of superposition is applicable. The outputs of M sensors at any time are then simply viewed as an unbalanced generator having M phases in the sense of conventional multiphase alternating current circuit theory.

The M vectors, $C_m$, representing the sensor outputs at time $t$ are, respectively, multiplied by M corresponding vectors, $B_m$, having values of $|B_m|e^{j\beta_m}$ where the $|B_m|$ values are the amplitude weights and the $\beta_m$ values are the phase weights which are used in a conventional beamforming process. The $B_m$ values may include any desired amplitude or phase shading. The M vectors thus generated by this complex multiplicative process also comprise the elements of another M phase unbalanced set of vectors. By the method of symmetrical components, commonly used in the analysis of fault currents in power distribution systems, these M beamformed vectors, $B_mC_m$, may be resolved into $(M-1)$ subsets of balanced M phase vectors and a single subset composed of M equal vectors. For a three phase system, the two balanced subsets are known, respectively, as the positive phase sequence components and the negative phase sequence components. The remaining equal vector subset is known as zero phase sequence components. Each of the three original vectors is the sum of a corresponding positive phase sequence component, negative phase sequence component, and zero phase sequnce component.

The sum of the $(M-1)$ symmetrically balanced components for each phase is most conveniently determined by subtracting the zero phase sequence component from the total phase vector. Since this sum is used in this invention, the resolution of the beamformed vectors, $B_mC_m$, into $(M-1)$ balanced subsets is not required, and thus most of the computation which is indirectly involved when matrix inversion is utilized is avoided. The rato of each beamformed vector minus its zero phase sequence component to the original sensor vector may then be expressed:

$$B_mC_m - (B_mC_m)_0]/C_m = [B_mC_m - (1/M)\sum_{m=1}^{M}\{B_mC_m\}]/C_m$$
(3)

The amplitude and phase of this complex number are, respectively, the amplitude and phase weights which must be applied to the $m$th sensor output to yield an array output free of the effects of the spatially stationary noise field. That is, if the noise field is spatially stationary, the subsequent outputs, $C_m'$, from the $m$th sensor will still be proportional to $C_m$ or $$C_m\underline{/\phi,}$$

where $\phi$ is a phase angle not a function of $m$, and thus the array frequency domain output is:

$$\sum_{m=1}^{M}\left\{C'_m[B_mC_m - (1/M)\sum_{m=1}^{M}\{B_mC_m\}]/C_m\right\}$$
$$= 1\angle\phi \sum_{m=1}^{M}\left[B_mC_m - (1/M)\sum_{m=1}^{M}\{B_mC_m\}\right] = 0$$
(4)

Since the latter overall summation is merely the sum of the $(M-1)$ balanced subsets of vectors, it must total zero.

If a desired signal is now added to the subsequent output from the sensors, the output vector from the $m$th sensor will no longer be $C_m$ or $$C_m\underline{/\phi,}$$

hence the array output will not be zero. The array output thus created by superposition of the desired signal will not necessarily be proportional to the desired signal, however, since different stationary noise fields may cause different weights to be generated which may not afford identical signals comparable treatment.

According to a further feature of this invention the desired signal which appears at the array output can be additionally weighted subsequently or weighted integrally in the beamforming process so that the array signal response in the presence of any stationary noise field will be linear with respect to the desired signal. That is, a novel automatic gain control is provided. Such control is accomplished by multiplying each of the foregoing weights, or alternatively the array output, by a normalizing factor so as to yield an effective set of beamforming weights $W_m$ which may be described:

$$W_m = \frac{\left[B_mC_m - (1/M)\sum_{m=1}^{M}\{B_mC_m\}\right]/C_m}{\sum_{m=1}^{M}\left\{H_m^*\left[B_mC_m - (1/M)\sum_{m=1}^{M}\{B_mC_m\}\right]/C_m\right\}}$$
(5)

where $B_m$ is a selected conventional complex beamforming weight for the mth channel and $H_m^*$ is defined as the complex conjugate another specific conventional beamforming weight $H_m$. $H_m^*$ may be described as:

$$H_m^* = K\Gamma_m$$
(6)

where K is any real or complex constant for all $m$ elements of the array and $\Gamma_m$ is the complex propagation factor of the equivalent electric network between the desired signal source and the output of the $m$th sensor. It is usually presumed but not required that all sensor outputs have imparted to them, relative gains which will equalize their power responses to the random isotropic noise field plus random circuit noise. Coherent circuit noise also may be interpreted to be a component of the spatially stationary noise field. By writing Equation 5 as a progressive function of time and substituting $\mu_m H_m$ for $B_m$, where $\mu_m$ may be considered to be any selected complex $m$th channel shading coefficient, the expression becomes $$W_m(t)$$
$$= \frac{\left[\mu_m H_m C_m(t) - (1/M)\sum_{m=1}^{M}\{\mu_m H_m C_m(t)\}\right]/C_m(t)}{\sum_{m=1}^{M}\left\{H_m^*\left[\mu_m H_m C_m(t) - (1/M)\sum_{m=1}^{M}\{\mu_m H_m C_m(t)\}\right]/C_m)t\right)}$$
(7)

If $W_m(t)$ is averaged over an interval of time, the average value may be expressed as $\overline{W_m(t)}$. By averaging over all time, the value of $\overline{W_m(t)}$ approaches the expectation of $W_m(t)$, for joint statistically stationary noise inputs, thus it is possible to express the approximate equality $$W_m(t)$$
$$\simeq \frac{\left[\mu_m H_m N_m - (1/M)\sum_{m=1}^{M}\{\mu_m H_m N_m\}\right]/N_m}{\sum_{m=1}^{M}\left\{H^*_m\left[\mu_m H_m N_m - (1/M)\sum_{m=1}^{M}\{\mu_m H_m N_m\}\right]/N_m\right\}}$$
(8)

where $N_m$ is the Fourier transform of only the spatially stationary part of the noise existing on the $m$th channel. It is also possible to show that the selection of $\mu_m$ as $1/\sigma_m^2$, where $\sigma_m^2$ is the random isotropic noise power at the $m$th sensor output, will yield maximum signal to noise ratio at the array output. It is thus possible to express the present vector output of the array at a single frequency as $$\sum_{m=1}^{M} \{C_m(t)\overline{W_m(t')}\} = \sum_{m=1}^{M} \left\{ C_m(t) \left[ \frac{[\mu_m H_m C_m(t') - (1/M)\sum_{m=1}^{M}\{\mu_m H_m C_m(t')\}]/C_m(t')}{\sum_{m=1}^{M}\left\{H^*_m[\mu_m H_m C_m(t') - (1/M)\sum_{m=1}^{M}\{\mu_m H_m C_m(t')\}]/C_m(t')\right\}} \right] \right\}$$

(9)

where $t'$ is displaced time, that is, real time during which the average value of $W_m$ is determined. Preferably $t'$ is the time during some interval just preceding present real time $t$ in a continuously running real time adaptive system. The square of the absolute magnitude of the expression of Equation 9 is proportional to the array single frequency power output. The inverse Fourier transform of the expression in Equation 9 is the array time varying output at a single frequency.

Equation 3 may be written in an alternative form:

$$B_m \left[ B_m C_m - (1/M)\sum_{m=1}^{M}\{B_m C_m\} \right]/\{B_m C_m\}$$

$$= B_m \left[ F_m - (1/M)\sum_{m=1}^{M} F_m \right]/F_m$$

(10)

where $F_m = B_m C_m$. Similarly Equation 5 may be written:

$$W_m = B_m \left[ \frac{\left[F_m - (1/M)\sum_{m=1}^{M} F_m\right]/F_m}{\sum_{m=1}^{M}\left\{H^*_m B_m \left[F_m - (1/M)\sum_{m=1}^{M} F_m\right]/F_m\right\}} \right] = B_m V_m$$

(11)

where $V_m$ is the modification of the $m$th channel beamforming weight to achieve the same result as with Equation 5. In this case, Equation 9 becomes:

$$\sum_{m=1}^{M}\{C_m(t)\overline{W_m(t')}\} = \sum_{m=1}^{M}\{B_m C_m(t)\overline{V_m(t')}\}$$

$$= \sum_{m=1}^{M}\{F_m(t)\overline{V_m(t')}\}$$

(12)

where $F_m(t) = B_m C_m(t)$, and $$\overline{V_m(t')} = \left[ \frac{\left[F_m(t') - (1/M)\sum_{m=1}^{M} F_m(t')\right]/F_m(t')}{\sum_{m=1}^{M}\left\{H^*_m B_m \left[F_m(t') - (1/M)\sum_{m=1}^{M} F_m(t')\right]/F_m(t')\right\}} \right]$$

(13)

Written in this form, the commutative, distributive, and associative laws of multiplication have been used. The form, however, indicates that a conventional beamforming weighting has taken place on each channel prior to being modified by an additional weight, which provides an alternate implementation configuration illustrated in FIG. 2.

SYSTEM DESCRIPTION

Figure 2:
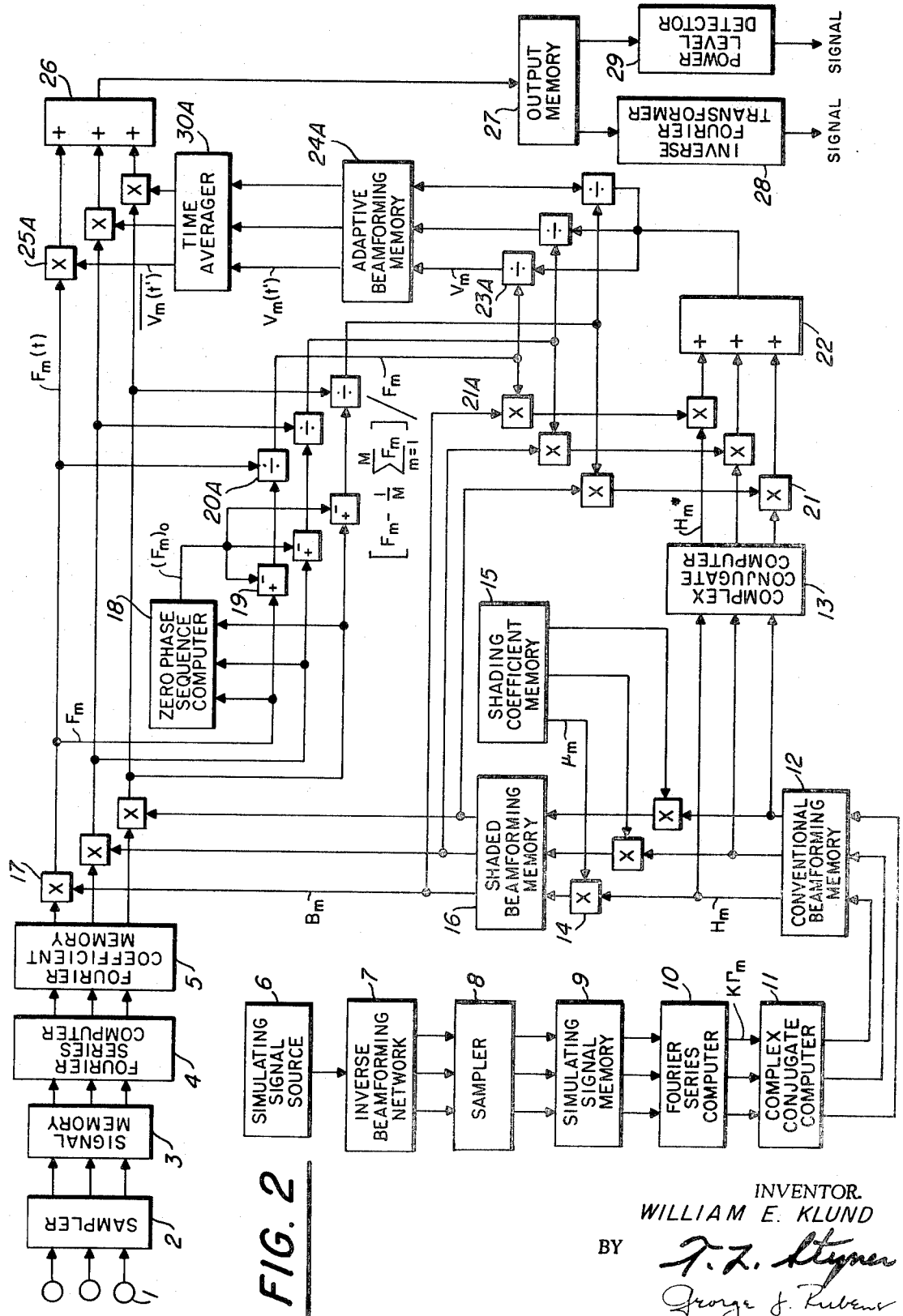
FIG. 2 is a block diagram of an alternative system embodying this invention.

FIGS. 1 and 2 suggest implementations of the method mathematically outlined above. The generalities of this invention will be served by referring to FIG. 1, illustrating three sensors 1. Further, for convenience, it will be assumed that the three sensors are arrayed in a straight line and that wanted signals received by the sensors arrive with a plane wave front. If the sensors were disposed in some other configuration, mathematics unrelated to this invention would enter. Signals picked up by the sensors, containing the wanted signal and unwanted noise, are invariably complex, containing both real and imaginary parts, when viewed in the frequency domain, and also contain a large or infinite number of frequency components. Conveniently, the signals of each sensor are sampled at a rate greater than twice the highest frequency component to be processed. The sampler 2 thus converts the continuous analog signal to a series of amplitude modulated pulses which completely define the incoming waveform over the frequency range of interest. Although both series and parallel computation can be employed, it is generally preferred that the signal memory 3 be provided in each information channel. Signal memory 3 preferably stores each sample amplitude in digitally encoded form.

According to an important feature of this invention each information channel signal is treated in the frequency domain. To this end each signal is converted in computer 4 to a series of Fourier coefficients, $C_n$. The outputs of the sampler 2 are each supplied to the signal memory 3 which stores all samples taken from all sensor outputs over a time segment normally equal to the interval of integration in the subsequent Fourier transformation. As each new sample is added to the memory 3, the oldest corresponding sample can be dropped.

In FIG. 3A is shown, and later to be described, one computer for deriving the Fourier series coefficients corresponding to the currently stored time sample sets for each sensor.

With appropriate computation speed an updated version of Fourier coefficients for each sensor channel may be computed as each new set of sensor samples is inserted in the signal memory 3. Normally, however, the signal memory 3 should undergo a complete refilling process between each successive Fourier series expansion.

Thus, an incrementally advancing "window" in the time domain output for each sensor enables an advancing set of Fourier series coefficients to emerge from each sensor channel output of the computer 4. For convenience and flexibility in programming the following computational steps, the output of the computer 4 is preferably stored in the Fourier coefficient memory 5. As new sets of coefficients are inserted in the memory 5, the oldest sets are normally dropped.

Figure 4:
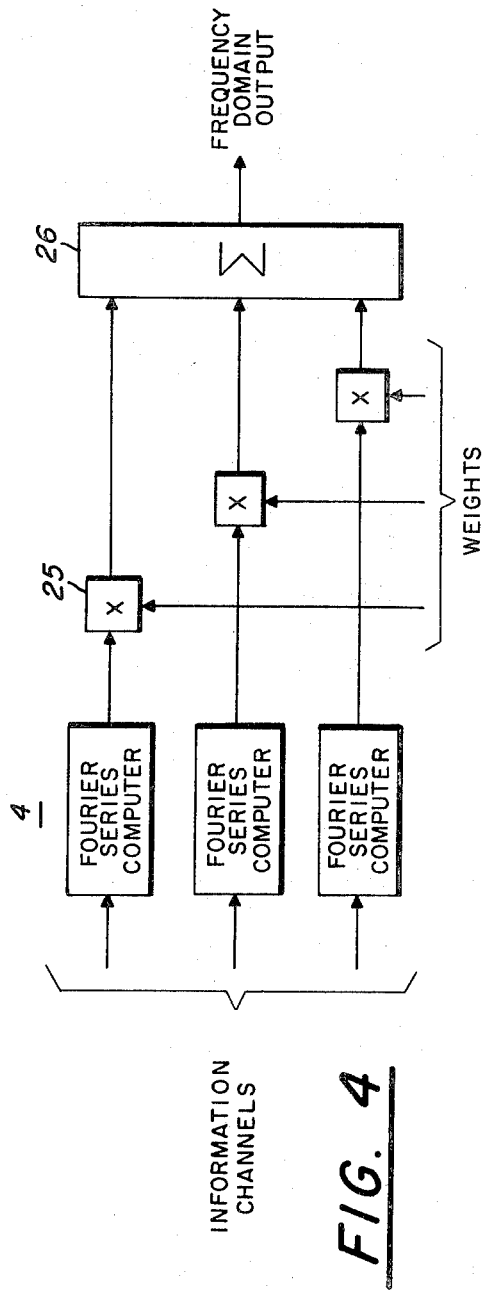
FIG. 4 is a block diagram illustrating the basic signal extraction process.

According to an important feature of this invention, best summarized in FIG. 4, the transformed information channel output signals are each weighted in the multiplicative devices 25 by weighting vectors of optimum amplitude and phase to minimize at the array output the noise received by the information channels. The weighted signals are then added in summer 26.

As shown in FIG. 1, the summed weighted signals are stored in memory 27, and preferably, are converted back to signals in the time domain in the inverse Fourier transformer 28, at the output of which appears the wanted signal, but with much of the contaminating noise removed. The weights for each of the multipliers 25 are selected to first form a beam in the conventional sense.

To this end, a simulating signal source 6 is provided to generate a signal with a spectral content sufficient to provide energy in all resolvable increments of frequency in the band of interest. That is, all frequency components of interest in the Fourier expansion are generated in the simulating signal source 6. An inverse beamforming network 7 has as its input the output of the source 6, and the several outputs of network 7 consist of simulations of the waveforms which would have appeared at the output of the sensors 1 had the source 6 been actually located at the point of origin of the wanted signal. Further, the inverse beamforming network 7 imparts the same characteristics of attenuation and phase shift to the output of the source 6 as would have been imparted by the medium itself and the sensors. An electrical or mechanical input to the network 7 is contemplated for generating the time delays corresponding to a beam in any desired direction, $\theta$, with respect to the line of the sensors 1. In the special case where the signal source is broadside to the array 1, the beamforming time delays for all sensors are identical, and the source 6 and its connected circuits can be disregarded. If desired, the signal transmission medium, such as earth strata or sea water, in conjunction with the actual sensors may be used instead of the inverse beamforming network provided that the signal source 6 is placed at the location of the wanted signal. The source 6 must be of sufficient strength in this case to completely override the effects of the noise field on the sensors.

Each of the outputs of the inverse beamforming network 7 is sampled by a set of samplers 8 at a rate normally not less than twice the frequency of the highest frequency component of interest. The outputs of the samplers 8 each are applied to a simulating signal memory 9 which stores all samples taken from sampler 8 over a time interval normally equal to the interval of integration to be used in the subsequent Fourier transformation process. This time interval will usually be equal to the pulse length, in the event the desired signal is a pulse, which can be considered to be a segment of a repetitive signal which repeats its waveform every pulse length. If the desired signal is of unknown waveform, but is of a continuing nature having a line spectral structure, the integration should preferably be sufficiently long to ing permit resolution of the line structure.

The output of the memory 9 is applied to the Fourier series computer 10 for computing Fourier coefficients corresponding to the stored time sample sets in simulating signal memory 9. Computer 10 may be the same as computer 4 in the information channels. The output of the computer 10 is supplied to a complex conjugate computer 11. One set of conjugate Fourier series coefficients for each simulated sensor channel of the system is then stored in conventional beamforming memory 12. These conjugate Fourier series coefficients are the desired conventional beamforming weights. Conventional beamforming memory 12 holds one complex weight for each sensor channel for each frequency component of interest. These weights are the complex multiplicative weights which would be used in forming a conventional beam. That is, they are the amplitude and phase weights for each sensor channel for each frequency of interest. Once these weights have been stored in memory 12 further action by elements 6 through 11 comprising the signal simulation system may be discontinued. If the surrounding noise field is purely random, isotropic, and spectrally flat, and the desired signal has the same spectral qualities as are simulated by the source 6, the maximum power signal to noise ratio will exist at the array output when the beamforming weights thus generated are used. This assumes that the signal waveform is not known, but that its power spectral qualities are known. That is, signal phase is unknown.

In most cases the conventional beamforming weights may be computed on the basis that the wanted signal arrives as a plane wave and that the sensors have equal receiving sensitivities. Fortunately, the signal simulation system described is adaptable to the situation where the sensors do not have equal receiving responses and where the desired signal is perturbed by reflection and diffraction near the sensors. Further, the respective beamforming weights in memory 12 may be modified or "shaded" to reduce sidelobe response, to permit phase defocussed reception over an angle greater than the conventional beamwidth corresponding to the array aperture, to enhance the array broadband output signal to noise power ratio, and to incorporate optimal matched filtering into the beamforming process. This is accomplished by multiplying each weight stored in the beamforming memory 12 by predetermined shading coefficients from the shading coefficient memory 15. The latter two may also require selection of K as a function of frequency. These products are formed in complex number multiplier 14, the outputs of which may be stored in shaded beamforming memory 16. Shaded weights and conventional weights are identical, of course, when all shading coefficients are unity or are otherwise equal.

In the specific embodiment of FIG. 1, the Fourier coefficients for the same single frequency component of each information channel, held in memory 5, are, respectively, applied in parallel to multipliers 17 and 25. The outputs of the multipliers 17 are applied as inputs to a zero phase sequence computer 18 and also to the add inputs of a set of subtractors 19. The zero phase sequence computer 18 takes the complex sum of its inputs and divides this sum by the number of sensor channels to form the complex mean or ensemble average value of its inputs. The output of the zero phase sequence computer 18 is applied to the subtract input of all of a set of subtractors 19. The output of each of the subtractors 19 is applied, respectively, to a numerator input of a set of complex number dividers 20. The denominator input to the set of dividers 20 is, respectively, the corresponding Fourier coefficient extracted from the Fourier coefficient memory 5. The outputs of dividers 20 contain the desired weights which will cause cancellation of the spatially stationary noise at the array output, and can be applied directly to the multiplicative devices 25. If, however, automatic gain control or signal normalization is required, the outputs of the dividers 20 can respectively be applied as one input of a set of multipliers 21. The remaining input of each of the multipliers 21 is derived from the corresponding output of the conventional beamforming memory 12, acting in conjunction with complex conjugate computer 13, which provides the conjugate weight. Preferably, outputs of the multipliers 21 are applied as inputs to a complex number adder 22. The adder 22 provides as its output the complex sum of its inputs which is in turn applied as the denominator input of a set of dividers 23. The remaining input to each of the dividers 23 is the corresponding output of the dividers 20. The dividers 23 provide as their outputs the respective ratios of the outputs of the dividers 20 to the output of adder 22. The outputs of the dividers 23 are applied to and stored in an adaptive beamforming memory 24. Preferably a time averager 30 provides corresponding time averages of weights which are inserted in memory 24.

The weights stored in adaptive beamforming memory 24, or their time averages, are the adapted complex beamforming weights which will effect signal reproduction and spatially stationary noise cancellation when applied to subsequent outputs from Fourier coefficient memory 5. The adaptive beamforming memory 24 and averager 30 serve as a time delay mechanism inasmuch as currently extracted weight sets were inserted at an earlier time and were based upon inputs to the system at that earlier time. Conveniently, the delay time imparted by memory 24 and averager 30 is normally shorter than the time interval over which the unwanted noise field exhibits spatially quasi-stationary properties. The rate at which weights are extracted from the adaptive beamforming memory 24 or time averager 30 is normally identical to the rate at which Fourier coefficients are extracted from the Fourier coefficient memory 5 when continued adaptation is desired. Refilling the adaptive beamforming memory 24 is normally necessary only when the quasi-stationary noise field properties change.

As sets of weights are extracted from the adaptive beamforming memory 24, or averager 30, they are applied, respectively, to one input of a set of multipliers 25. The remaining input of the multipliers 25 is derived from the corresponding outputs of Fourier coefficient memory 5. The complex outputs of the multipliers 25 are applied as inputs to a complex adder 26. The adder 26 forms the complex sum of its inputs and applies this sum to the input of an output memory 27. As the sets of Fourier coefficients corresponding to each frequency component are extracted from the Fourier coefficient memory 5, they undergo the processes just described, and their weighted sums are applied as inputs to output memory 27. When the output memory 27 has been filled with complex numbers corresponding to each frequency component of interest, the oldest numbers are normally discarded and are replaced by current numbers in synchronism with the dropping and replacement of Fourier coefficients in the Fourier coefficient memory 5. At any one instant of time, the output memory 27 contains the Fourier series coefficients which represent the desired signal in the frequency domain, assuming that such a signal has been received.

The coefficients stored in the output memory 27 are each applied to the input of an inverse Fourier transformer 28. The inverse Fourier transformer 28 normally multiples each coefficient by a complex number of $e^{j\omega_n t}$, where $\omega_n$ is the angular frequency corresponding to the $n$th frequency component, and $t$ is the time. The quantity $t$ normally advances by one same interval of the samplers 2 each time a new product is formed in inverse Fourier transformer 28 for each frequency component of interest so that a running sampled product is formed. This permits a sufficiently high sample rate to permit waveform reconstruction. The inverse Fourier transformer 28 also normally sums the real parts of the product sets and provides this sum as a sampled time varying output. In the event that the zero time reference point has been permitted to progress in time as successive sets of Fourier coefficients are computed by the Fourier series computer 4 the quantity $t$ utilized by the inverse Fourier transformer 28 remains zero, and hence the inverse Fourier transformer 28 normally provides as its output the sum of the real parts of the current contents of the output memory 27. This sum is updated at the previously mentioned sample rate. In either of these cases, the output of the inverse Fourier transformer 28 is essentially a reproduction of the waveform of the wanted signal, free of the effects of the surrounding spatially stationary noise field, but perturbed by the random isotropic part of the noise field.

The coefficients stored in the output memory 27 may, alternatively, be applied to the input of a power level detector 29. The power level detector 29 may be of the type which sums the squares of the absolute magnitudes of the complex coefficients currently stored in the output memory 27. The output of the power level detector 29 is thus essentially proportional to the broadband power contained in the wanted signal.

In the event that the exact waveform of the wanted signal is a known quantity, the relative phases and amplitudes of its individual Fourier components are also known. When inverse Fourier transformer 28 imparts the reciprocal or reverse relative phase shift to each frequency component that it operates upon in addition to the processes described earlier, as well as weighting in proportion to the known signal voltage spectrum, there will exist a point in time when the components making up the output of inverse Fourier transformer 28 all reach their peak or maximum values essentially simultaneously When inverse Fourier transformer 28 is implemented in this fashion, it performs the function commonly known as optical matched filtering or replica cross-correlation. Alternatively, and preferably, this same effect can be realized merely by adjusting the conventional beamforming amplitude and phase weights as a function of frequency by proper selection of K. The residual random noise which would have appeared at the output of inverse Fourier transformer 28 in the absence of the additional weighting and phase shifting process will still be random. The output of power level detector 29 may also be frequency weighted in order to achieve so-called optimal filtering. This can, preferably, be accomplished by adjusting the conventional beamforming weights as a function of frequency by proper selection of K.

FIG. 2 shows an alternative implementation of the principles of this invention. In FIGS. 1 and 2, elements of like function are identified by corresponding reference characters. In FIG. 2, the adaptive beam weighting information is applied to the sensor signal vectors in two steps. Note that the multipliers 17 and 25A are connected between the sensor signal source and the output of the system and jointly perform the equivalent mathematical operations as multipliers 25 of FIG. 1. Multipliers 17 could have replaced beamforming delay lines between sensors 1 and sampler 2. The computer 18 for deriving the zero phase sequence components functions as in FIG. 1 as do the subtractors 19. The dividers at 20A provide $$[B_m C_m - (B_m C_m)_0]/\{B_m C_m\}$$

and the multipliers 21A remove the term $B_m$ from the denominator of this expression. The multipliers 21, adder 22, and dividers 23A function essentially as in FIG. 1 for the purpose of automatically controlling the gain of the desired signal. One input to dividers 23A is slightly different from that of dividers 23 of FIG. 1 as a result of the two stage beamforming process, however.

As suggested above, once beamforming information has been created and stored, as in memory 12, the elements 6 through 11 may be disconnected until and unless a new beam direction or desired signal location is required. If now a broadside beam is considered, as when mechanical movement of a linear array presents the side of the array to the signal, additional element phasing is not necessary for beam formation, and computation of the weights, $W_m$, for each of the M information channels can be simplified. These weights are essentially proportional to ratios of each vector, $C_m$, representing the resultant amplitude and phase of the complex signal on the $m$th information channel, minus the ensemble average vector, $(C_m)_0$, representing the vectorial mean of amplitude and phases of all the information channels, to the vector $C_m$. More precisely the zero phase sequence computer and associated components are now called upon to subtract $(C_m)_0$ from $C_m$ and divide by $C_m$, analogous to the mathematical operations in expression (3) above, but with $B_m$ set equal to a constant. Thereupon the $m$th vector weight $W_m$ or alternatively its time average is applied to the $m$th information channel in the multipliers 25.

In FIG. 3A is shown one technique for generating the coefficients for a Fourier series expansion. There are M sensors, numbered 1 to M, and the frequencies of interest include all components from the first to the Nth. Each time varying sensor signal is applied to the analog-to-digital converter 2A which includes as one input a chopping or sampling signal, S, for sampling at measured intervals the amplitude of the signal. The digital output of each sampler is stored in the Delay Line Time Compressor, or Deltic, A comprising a recirculating delay line for holding digital information as long as desired. From such a storage the time compressed signals are then successively multiplied by correspondingly time compressed sine and cosine waves, in quadrature pairs, for all frequencies from 1 to N. Generators 50 develop time compressed versions of $\cos \omega_1 t$ and $\sin \omega_1 t$ where $\omega_1$ is the fundamental angular frequency of the Fourier expansion. That is $\omega_1 = 2\pi/$deltic sampling interval. Generators 51 produce time compressed versions of $\cos 2\omega_1 t$ and $\sin 2\omega_1 t$ for the second component, et cetera, so that the Nth generators 52 of the series generate time compressed versions of $\cos N\omega_1 t$ and $\sin N\omega_1 t$ for the highest, or Nth, components contained in the received signal to be processed. The Fourier series computer 4 comprises essentially pairs of multipliers 60, 61, and 62 for multiplying each complex sensor signal with each pair of quadrature reference voltages of each frequency 1 to N. Integrators 70, 71, and 72 integrate the products, respectively, of the multipliers over a time period corresponding to the sample period of S. The output voltages of each quadrature integrator pair is the Fourier coefficient desired, in rectangular form, and is indicated at output terminals $a$ and $b$. The first subscript of each coefficient indicates the harmonic, 1 to N, involved whereas the second subscript indicates the number of the information channel, 1 to M.

Figure 3B:
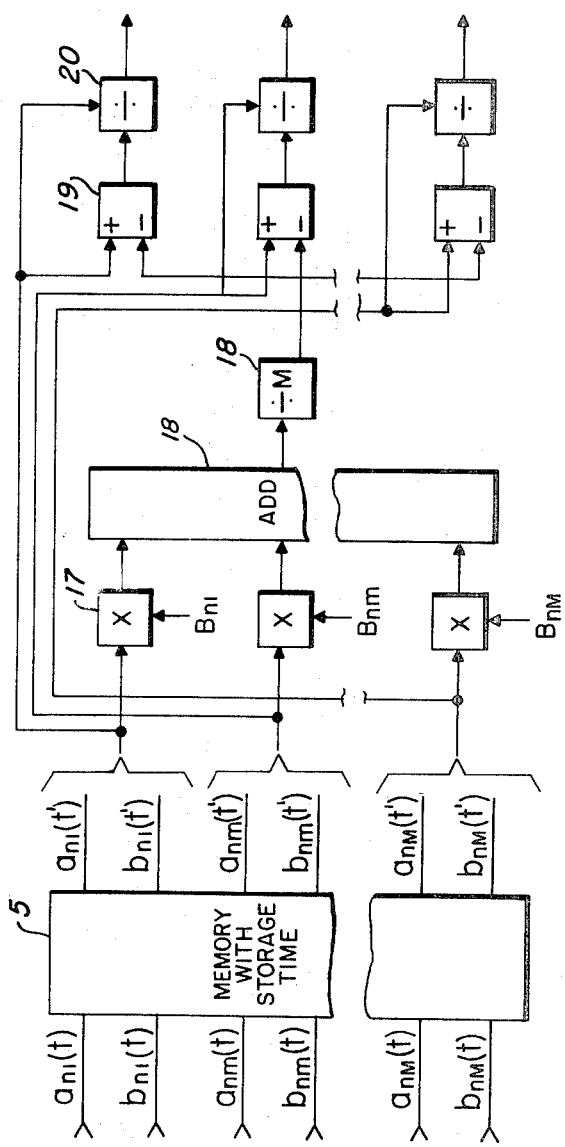
FIG. 3B is a block diagram illustrating the formation of basic adaptive weights.

In FIG. 3B, all coefficients are fed into the memory 5, which has an inherent time delay resulting from information storage. The contents of the memory are read out by an electronic scanning switch which is the equivalent of a mechanical M-blade, N-position switch. The $a$ and $b$ coefficients for the N harmonics, respectively, are fed into the multipliers 17 as complex numbers, where they are weighted by the beam information, if any, for each of the sensor channels. As in FIG. 1, the outputs of the multiplier 17 are then added and divided by M in zero phase sequence computer 18 to derive the zero phase sequence components. Substraction at 19 and division at 20 are performed as in FIG. 1.

Specific arrangement of the parts of the system described for minimizing noise in an array of signals may assume many configurations without departing from the scope of the appended claims. Likewise, the software of the computer programmer for that purpose is quite tractable within the scope of this invention. Further, the hardware for performing each computational operation is highly developed and may be widely chosen by those skilled in the computer art for practicing this invention.

What is claimed is:

1. A method of extracting a wanted signal from a plurality of composite signals, containing both said wanted signal and unwanted noise, which are conveyed by an array of information channels, said method comprising the steps of;
    generating Fourier coefficients corresponding to the waveform conveyed by each of said information channels,
    weighting, in amplitude and phase, the Fourier coefficients thus generated, so as to enhance said array output wanted signal to unwanted noise ratio, and finally,
    summing sets of weighted Fourier coefficients of like frequency, so as to form an array frequency domain output.

2. In the method of claim 1, said step of weighting further comprising;
    adjusting the weights applied to the different Fourier coefficients in accordance with the predetermined wanted signal amplitude and phase disparities over said array of information channels.

3. In the method of claim 1, said step of weighting further comprising;
    adjusting the weights applied to the different Fourier coefficients so as to eliminate the array output response to the stationary parts of said unwanted noises.

4. In the method of claim 1, said step of weighting further comprising;
    adjusting the weights applied to the different Fourier coefficients so as to cause normalization of the wanted signal portion of the output of said summing step irrespective of the structure of the stationary parts of said unwanted noises.

5. In the method of claim 1, said step of weighting further comprising;
    adjusting the weights applied to the different Fourier coefficients to be time averages of successive corresponding weights.

6. The method of claim 1 further comprising the step of;
    imparting additional relative amplitude weighting, as a function of frequency, jointly to all of said information channels so as to cause a further enhancement of the array output broadband wanted signal to unwanted noise power ratio.

7. The method of claim 1 further comprising the step of;
    imparting additional relative amplitude and relative phase weighting, as a function of frequency, jointly to all of said information channels so as to cause a further enhancement of the array output wanted signal to unwanted noise energy ratio.

8. The method of claim 2 further comprising the steps of;
    generating a simulated wanted signal,
    computing from said simulated signal a set of responses, which would have appeared on said information channels had said simulated signal been emanated from a predetermined location and propagated by the actual transmission medium to said information channels, so as to form a corresponding frequency set of complex beamforming weights, $B_m$, where $B_m = \mu_m H_m$, $\mu_m$ is a selected corresponding frequency set of shading coefficients, $H_m$ is a corresponding frequency complex number set receptively proportional to $T_m^*$ and $T_m$ is the corresponding frequency complex propagation factor set which describes gain and phase shift from said simulated signal source to said information channels.

9. The method of claim 1 further comprising;
    the step of extracting the power corresponding to the information contained in the output channel.

10. The method of claim 1 further comprising;
    the step of extracting the time varying waveform corresponding to the information contained in the output channel.

11. A method of spatial signal processing for extracting wanted signals from unwanted noise, said method comprising the steps of;
    sensing said signal and noise on an array of M spatially diverse sensors,
    generating for said sensor outputs, Fourier coefficients $C_m$, corresponding to time segments of said sensor waveforms, where $C_m$ is a like frequency set of Fourier coefficients and $m$ is a sensor designator,
    weighting said like frequency sets of Fourier coefficients, $C_m$, thus generated, in amplitude and phase, by corresponding like frequency sets of predetermined complex beamforming weights, $B_m$, so as to enhance said array signal to noise response to a wanted signal originating from a predetermined spatial location; and finally,
    summing like frequency sets of weighted Fourier coefficients so as to form an array frequency domain output.

12. In the method of claim 11, said step of weighting further comprising;
    adaptively modifying, so as to eliminate said array response to the stationary part of the noise field, each like frequency set of applied weights to be proportional to $$\left[B_m C_m - (1/M) \sum_{m=1}^{M} \{B_m C_m\}\right]/C_m$$

where $C_m$ is a like frequency set of said Fourier coefficients not restricted to the same time segment of the like frequency set undergoing weighting.

13. The method of claim 12, further comprising the step of;

adjusting, so as to cause normalization of the wanted signal portion of the output of said array irrespective of the origin and structure of said stationary part of the noise field, each like frequency set of adaptively modified applied weights to be equal to $$\frac{\left[B_m C_m - (1/M) \sum_{m=1}^{M} \{B_m C_m\}\right]/C_m}{\sum_{m=1}^{M} \left\{H_m^*\left[B_m C_m - (1/M) \sum_{m=1}^{M} \{B_m C_m\}\right]/C_m\right\}}$$

where $H_m^*$ is a frequency dependent complex number set respectively proportional to a like frequency predetermined complex propagation factor set $\Gamma_m$ which describes transfer characteristics of the medium between said wanted signal source and said sensor outputs, and $C_m$ is a like frequency set of said Fourier coefficients not restricted to the same time segment of the like frequency set undergoing weighting.

14. In the method of claim 12, the step of adaptively modifying further comprising;

time averaging of several modified weights of like frequency and like sensor designator $m$.

15. A method of adaptive spatial signal processing for extracting wanted signals from unwanted noise, said method comprising the steps of;

sensing said signal and noise on an array of M spatially diverse sensors, forming an array of information channels corresponding to said sensors, imparting predetermined relative gain and phase shift, as a function of frequency, to each of said information channels so as to achieve a corresponding array of beamformed information channels, generating for said beamformed information channels, Fourier coefficients, $F_m$, corresponding to time segments of the waveforms conveyed, where $F_m$ is a like frequency set of Fourier coefficients and $m$ is a channel designator, weighting, so as to eliminate said array response to the stationary part of the noise field, each like frequency set of Fourier coefficients thus generated, in amplitude and phase, by corresponding like frequency sets of weights proportional to $$\left[F_m - (1/M) \sum_{m=1}^{M} F_m\right]/F_m$$

where $F_m$ is a like frequency set of said Fourier coefficients not restricted to the same time segment of the like frequency set undergoing weighting, and finally, summing like frequency sets of weighted Fourier coefficients so as to form an array frequency domain output.

16. The method of claim 15, further comprising the step of;

adjusting, so as to cause normalization of the wanted signal portion of the output of said array irrespective of the origin and structure of said stationary part of the noise field, each like frequency set of weights to be equal to $$\frac{\left[F_m - (1/M) \sum_{m=1}^{M} F_m\right]/F_m}{\sum_{m=1}^{M} \left\{H_m^* B_m [F_m - (1/M) \sum_{m=1}^{M} F_m]/_m\right\}}$$

where $H_m^*$ is a frequency dependent complex number set respectively proportional to a like frequency predetermined complex propagation factor set, $\Gamma_m$, which describes transfer characteristics of the medium between said wanted signal source and said sensor outputs, $B_m$ is a like frequency complex number set which describes the relative gain and phase shift imparted in forming said beamformed information channels, and $F_m$ is a like frequency set of said Fourier coefficients not restricted to the same time segment of the like frequency set undergoing weighting.

17. In the method of claim 15, the step of weighting further comprising;

time averaging of several weights of like frequency and like channel designator $m$.

References Cited
UNITED STATES PATENTS

| | | | |
|---|---|---|---|
| 2,982,853 | 5/1961 | Price et al. | 328—165 XR |
| 3,162,808 | 12/1964 | Haase. | |
| 3,209,250 | 9/1965 | Burns et al. | 324—77 |
| 3,464,016 | 8/1969 | Kerwin et al. | 328—166 XR |

STANLEY T. KRAWCZEWICZ, Primary Examiner

U.S. Cl. X.R.

324—77

UNITED STATES PATENT OFFICE
CERTIFICATE OF CORRECTION

Patent No. 3,541,458            Dated November 17, 1970

Inventor(s)     William E. Klund

It is certified that error appears in the above-identified patent and that said Letters Patent are hereby corrected as shown below:

Page 2, line 30    the word "sure" should be changed to "pure"

page 2, line 36      The letters "C" and "n" in $C_n(t)$ should be italic.

Page 2, Eq. (1)      The letter "n" should be italic in two places. The letter "т" should be italic in the exponent and in both integral limits. letter "T" should be italic in the exponent and in the lower gral limit. The letter "j" in the exponent should be italic.

page 2, Eq. (2)      The letter "n" should be italic in two places. The letter "т" should be italic in the exponent and in the lower integral li The letter "j" in the exponent should be italic.

page 2, line 51      The letter "g" in $g(\tau)$ should be italic.

page 2, line 52      The subscript "n" should be italic in two places in the equat Add the word "case" after the word former.

page 2, line 53      The letter "n" should be italic in three places in the equati The letters "t", "T", and "j" in the exponent should be itali page 2, line 55      The letters "C" and "n" in $C_n(t)$ should be italic.
page 2, line 59      The word "weighing" should be -- weighting --.
page 2, line 65      The letters "C" and "n" in $C_n(t)$ should be italic.

page 3, line 14      The letter "M" should be italic.

page 3, line 15      The letter "M" should be italic.

page 3, line 18      The letter "M" should be italic. The letters "C" and "m" in $C_m$ should be italic.

3,541,458
(2)

| | |
|---|---|
| page 3, line 19 | The letter "M" should be italic. |
| page 3, line 20 | The letters "B" and "m" should be italic in three occurrences of $B_m$. The subscript "m" in $e^{j\beta_m}$ should be italic and should be elevated 1/2 space. The letter "j" in the exponent should be italic. |
| page 3, line 21 | The subscript "m" in $\beta_m$ should be italic. |
| page 3, line 23 | The letters "B" and "m" in $B_m$ should be italic. |
| page 3, line 24 | The letter "M" should be italic. |
| page 3, line 26 | The letter "M" should be italic. |
| page 3, line 29 | The letter "M" should be italic. The letters "B", "C", and "m" in $B_m C_m$ should be italic. |
| page 3, line 30 | The second occurrence of the letter "M" should be italic. |
| page 3, line 31 | The letter "M" should be italic. |
| page 3, line 44 | The letters "B", "C", and "m" in $B_m C_m$ should be italic. |
| page 3, line 47 | The word "rato" should be changed to "ratio". |
| page 3, Eq. (3) | The subscript "m" should be italic in 10 places. The letters "M" and "m" in the summation limits should be italic. The left hand bracket "[" of the equation was omitted and should be inserted. |
| page 3, line 60 | The letters "C" and "m" in $C'_m$ should be italic. The prime in $C'_m$ should be placed immediately above the subscript m. |
| page 3, line 61 | The letters "C" and "m" in $C_m$ should be italic. |
| page 3, line 63 | The subscript "m" should be italic. |

| | |
|---|---|
| page 3, Eq.(4) | The subscript "m" should be italic in 10 places. The letter "M" and "m" in all four summation limits should be italic. subscript "m" in $C'_m$ should be placed immediately below the prime mark. |
| page 4, line 3 | The letters "C" and "m" in $C_m$ should be italic. |
| page 4, line 4 | The subscript "m" should be italic. |
| page 4, line 22 | The letters "W" and "m" in $W_m$ should be italic. |
| page 4, Eq.(5) | The subscript "m" should be italic in 12 places. The letters and "m" in each of the three summation limits should be ital[ic]. The asterisk "*" should appear immediately above the subscript in $H^*_m$. |
| page 4, line 31 | The letters "B" and "m" in $B_m$ should be italic. |
| page 4, line 32 | The letter "m" in mth should be italic. The letters "H" and in $H^*_m$ should be italic. The asterisk "*" should appear imme[diately] above the subscript m in $H^*_m$. |
| page 4, line 34 | The letters "H" and "m" in both $H_m$ and $H^*_m$ should be italic. asterisk "*" should appear immediately above the subscript m $H^*_m$. |
| page 4, Eq.(6) | The subscript "m" should be italic in two places. The asteri[sk] "*" should appear immediately above the subscript m in $H^*_m$. |
| page 4, line 36 | The letter "K" should be italic. |
| page 4, line 37 | The subscript "m" in $\Gamma_m$ should be italic. |

3,541,458
(4)

| | |
|---|---|
| page 4, line 46 | The subscript "m" should be italic in three places. The "H" and "B" should be italic. |
| page 4, line 47 | The subscript "m" in μ$_m$ should be italic. |
| page 4, Eq.(7) | The subscript "m" should be italic in 16 places. The let and "m" should be italic in each of the three summation l The asterisk "*" should appear immediately above the subs m in H$_m^*$. The final closing brace "}" in the denominator been omitted and should be added. The closing parenthesi immediately above the (7) should be reversed "{". |
| page 4, line 58 | The letters "W" and "m" in W$_m$($t$) should be italic. |
| page 4, line 59 | The letters "W" and "m" in W$_m$ ($t$) should be italic. The this expression should be unbroken. |
| page 4, line 60 | The letters "W" and "m" in W$_m$($t$) should be italic. The b this expression should be unbroken. |
| page 4, line 61 | The letters "W" and "m" in W$_m$($t$) should be italic. |
| page 4, Eq.(8) | The subscript "m" should be italic in 16 places. The let "M" and "m" should be italic in all three summation limit subscript "m" should appear immediately below the asteris Add a bar over "W$_m$($t$)". |
| page 4, line 72 | The letters "N" and "m" in N$_m$ should be italic. |
| page 4, line 74 | The subscript "m" in μ$_m$ should be italic. |
| page 4, line 75 | The subscript "m" should be italic in two places. |

3,541,458
(5)

| | |
|---|---|
| page 5, Eq.(9) | The subscript "m" should be italic in 18 places. The letter and "m" should be italic in all five summation limits. The script "m" should appear immediately below the asterisk in H The closing parenthesis ")" of (1/M) in the denominator has omitted and should be added. The closing brace "}" should t moved to the right so that it is not under the bar. |
| page 5, line 14 | The letters "W" and "m" in $W_m$ should be italic. |
| page 5, Eq.(10) | The subscript "m" should be italic in 11 places. The letter "M" and "m" should be italic in both sets of summation limit |
| page 5, line 31 | The subscript "m" should be italic in three places. |
| page 5, Eq.(11) | The subscript "m" should be italic in 12 places. The letter "M" and "m" should be italic in all three summation limits. asterisk "*" should appear immediately above the subscript m in $H_m^*$. The extreme right hand bracket "]" should be moved immediately to the left of the last "=" sign. |
| page 5, line 42 | The letters "V" and "m" in $V_m$ should be italic. |
| page 5, Eq.(12) | The subscript "m" should be italic in 7 places. The letters "M" and "m" in all three summation limits should be italic. |
| page 5, line 52 | The subscript "m" should be italic in three places. |
| page 5, Eq.(13) | The subscript "m" should be italic in 9 places. The letters "M" and "m" should be italic in all three summation limits. subscript "m" should appear immediately below the asterisk i $H_m^*$. | page 6, line 31 — The letters "C" and "n" in $C_n$ should be italic.

page 9, line 39 — The letters "j", "n", and "t" in the exponent should be italic. The "w" in the exponent should be changed to omega, "ω". The subscript "n" in the exponent should be elevated 1/2 space. The word "of" should be deleted. Change "multiples" to "multipl page 9, line 40 — The subscript "n" in $\omega_n$ should be italic.

page 9, line 42 — The word "same" should be changed to "sample".

page 10, line 10 — The word "optical" should be changed to "optimal".

page 10, line 14 — The letter "K" should be italic.

page 10, line 37 — The subscript "m" should be italic in 6 places.

page 10, line 39 — The letters "B" and "m" in $B_m$ should be italic.

page 10, line 54 — The letters "W" and "m" in $W_m$ should be italic. The letter "M" should be italic.

page 10, line 56 — The letters "C" and "m" in $C_m$ should be italic.

page 10, line 59 — The letters "C" and "m" in $(C_m)_o$ should be italic.

page 10, line 60 — The letters "C" and "m" in $C_m$ should be italic.

page 10, line 63 — The letters "C" and "m" in $C_m$ should be italic in three places.

| | |
|---|---|
| page 10, line 65 | The letters "B" and "m" in $B_m$ should be italic. |
| page 10, line 66 | The letters "W" and "m" in $W_m$ should be italic. |
| page 10, line 69 | The letter "M" should be italic. |
| page 10, line 70 | The letter "M" should be italic. |
| page 10, line 71 | The letter "N" in Nth should be italic. |
| page 10, line 74 | The letter "S" should be italic. |
| page 11, line 2 | The letter "A" after the comma should be "3A". |
| page 11, line 7 | The letter "N" should be italic. |
| page 11, line 12 | The letter "N" in Nth should be italic. |
| page 11, line 13 | The letter "N" in $\cos N\omega_1 t$ should be italic. |
| page 11, line 14 | The letter "N" in $\sin N\omega_1 t$ and in Nth should be italic in both places. |
| page 11, line 19 | The letter "N" should be italic. |
| page 11, line 21 | The letter "S" should be italic. |
| page 11, line 25 | The letter "N" should be italic. |
| page 11, line 27 | The letter "M" should be italic. |
| page 11, line 32 | The letters "M" and "N" should be italic. |
| page 11, line 33 | The letter "N" should be italic. |

| | |
|---|---|
| page 11, line 37 | The letter "M" should be italic. |
| page 12, line 38 | The letter "B" and "m" in $B_m$ should be italic. |
| page 12, line 39 | The subscript "m" should be italic in four places. |
| page 12, line 40 | The letters "H" and "m" in $H_m$ should be italic. |
| page 12, line 41 | Change the word "receptively" to "respectively". |
| page 12, line 42 | The subscript "m" should be italic in two places. The letter should be changed to gamma, "$\Gamma$" in two places. The asterisk should appear immediately above the subscript m in $\Gamma_m^*$. A comma was omitted between "$\Gamma_m^*$" and the word "and". |
| page 12, line 56 | The letter "M" should be italic. |
| page 12, line 59 | The letters "C" and "m" in $C_m$ should be italic. |
| page 12, line 60 | The letters "C" and "m" in $C_m$ should be italic. |
| page 12, line 63 | The letters "C" and "m" in $C_m$ should be italic. |
| page 12, line 65 | The letters "B" and "m" in $B_m$ should be italic. |
| page 13, line 4 | The subscript "m" should be italic in 5 places. The letter and "m" in the summation limits should be italic. |
| page 13, line 6 | The letters "C" and "m" in $C_m$ should be italic. |
| page 13, line 17-22 | The subscript "m" should be italic in 11 places. The letter and "m" should be italic in all three summation limits. The asterisk "*" should appear immediately above the subscript $H_m^*$. | page 13, line 23   The letters "H" and "m" in $H_m^*$ should be italic. The asterisk "*" should appear immediately above the subscript m in $H_m^*$.

page 13, line 25   The subscript "m" in $\Gamma_m$ should be italic.

page 13, line 28   The letters "C" and "m" in $C_m$ should be italic.

page 13, line 38   The letter "M" should be italic.

page 13, line 47   The letters "F" and "m" in $F_m$ should be italic.

page 13, line 48   The letters "F" and "m" in $F_m$ should be italic page 14, lines 3-5   The subscript "m" should be italic in 3 places. The letters and "m" in the summation limits should be italic.

page 14, line 6   The letters "F" and "m" in $F_m$ should be italic.

page 14, lines 20-26   The subscript "m" should be italic in 8 places. The letters and "m" should be italic in all three summation limits. The asterisk "*" should appear immediately above the subscript m $H_m^*$.

The final letter "F" in the denominator has been omitted and should be added just to the left of the lone subscript m.

page 14, line 27   The letters "H" and "m" in $H_m^*$ should be italic. The asterisk should appear immediately above the subscript m in $H_m^*$.

page 14, line 29   The subscript "m" in $\Gamma_m$ should be italic.

page 14, line 32   The letters "B" and "m" in $B_m$ should be italic.

page 14, line 35   The letters "F" and "m" in $F_m$ should be italic.

Signed and sealed this 23rd day of May 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,541,458   Dated November 17, 1970

Inventor(s) William E. Klund

It is certified that error appears in the above-identified patent and that said Letters Patent are hereby corrected as shown below:

Column 2, line 30, cancel "such as a sure tone" and insert after "function", second occurrence, -- such as a pure tone --; column 8, line 21, italicize "K". column 10, line 27, italicize "K".

Signed and sealed this 19th day of December 1972.

(SEAL)
Attest:

EDWARD M. FLETCHER, JR.
Attesting Officer

ROBERT GOTTSCHALK
Commissioner of Patents